United States Patent [19]

Green, Sr. et al.

[11] Patent Number: 5,094,352

[45] Date of Patent: Mar. 10, 1992

[54] PORTABLE RACK FOR HOLDING POTS AND PANS AND THE LIKE

[76] Inventors: James F. Green, Sr.; Annie L. Green, both of 1316-B Georgetown Blvd., Lansing, Mich. 48911

[21] Appl. No.: 696,006

[22] Filed: May 6, 1991

[51] Int. Cl.⁵ ............................................. B66C 23/42
[52] U.S. Cl. ................................. 211/186; 211/59.1
[58] Field of Search ............. 211/186, 187, 189, 59.1; 248/220.3

[56] References Cited

U.S. PATENT DOCUMENTS

| | | | |
|---|---|---|---|
| 1,810,826 | 6/1931 | Gray . | |
| 2,016,421 | 10/1935 | Eichner | 211/160 |
| 2,626,711 | 1/1953 | Saul et al. | 211/13 |
| 3,172,376 | 3/1965 | Havlis | 211/186 X |
| 3,173,386 | 3/1965 | Magers | 108/108 |
| 3,695,455 | 10/1972 | Larson | 211/78 |
| 4,480,755 | 11/1984 | Cartwright | 211/60 T |
| 4,531,645 | 7/1985 | Tisbo et al. | 211/131 |

Primary Examiner—Ramon O. Ramirez
Attorney, Agent, or Firm—Richard P. Matthews

[57] ABSTRACT

A portable rack for holding pots and pans and the like. Two pair of main frame leg members slope inwardly toward each other and are provided with swivel casters to provide portability. Each pair of leg members supports a peg board to which pots and pans are attached by conventional hooks. A top closure member is positioned at the top of the inwardly sloping leg members. At least two shelf members are provided between the sloping leg members. An interior retaining slot for cookie sheets and lids for the pots and pans is provided at each end of each shelf defined by portions of the peg board members, the shelves themselves and an additional retaining strip secured to inside surfaces of the leg members and spaced vertically from the shelf members.

4 Claims, 3 Drawing Sheets

PORTABLE RACK FOR HOLDING POTS AND PANS AND THE LIKE

This invention relates to a portable storage rack and, more particularly, to a portable rack for storing pots, pans, cookie sheets and lids for the pots and pans.

BACKGROUND OF THE INVENTION

Heretofore, it has been the practice to store pots, pans, cookie sheets and lids for pots and pans in lower cupboards or stoves which have not been readily accessible and which has required a chef or other person who is cooking or baking to bend over and sort through the items being stored in order to find a desired implement. This has proven to be especially troublesome for older cooks or handicapped people.

SUMMARY OF THE INVENTION

In accordance with the present invention, the difficulties and lack of accessibility of cooking and baking vessels including those previously mentioned are effectively overcome. In particular, pots and pans and related implements such as lids and cookie sheets, are individually stored on peg board members at elevations where they are readily seen and retrieved without any inordinate amount of bending, stooping or kneeling, or the necessity of having to rummage through many assorted pots and pans to find the one particular item being sought. This invention makes use of sloping peg board members which prevents or minimizes clattering of pots and pans in the storage thereof. Each individual cooking or baking implement may be suspended from conventional hooks inserted into the holes of the peg board members. The rack is made portable by the use of swivel caster members, one of which is inserted into each of the main support legs.

At least two shelf members are disposed in the interior space between the inwardly sloping peg board members. Associated with each shelf member is at least one retaining slot for cookie sheets and covers for the pots and pans. Each retaining slot is defined by a portion of an inside surface of one of the peg board members, by a portion of one of the shelf members and by an additional retaining strip secured to an inside attaching surface of each of a pair of the leg members spaced vertically from the shelf member.

The inherent advantages and improvements of the present invention will become more readily apparent by reference to the following detailed description of the invention and by reference to the accompanying drawings wherein:

DETAILED DESCRIPTION OF THE INVENTION

Figure 1:
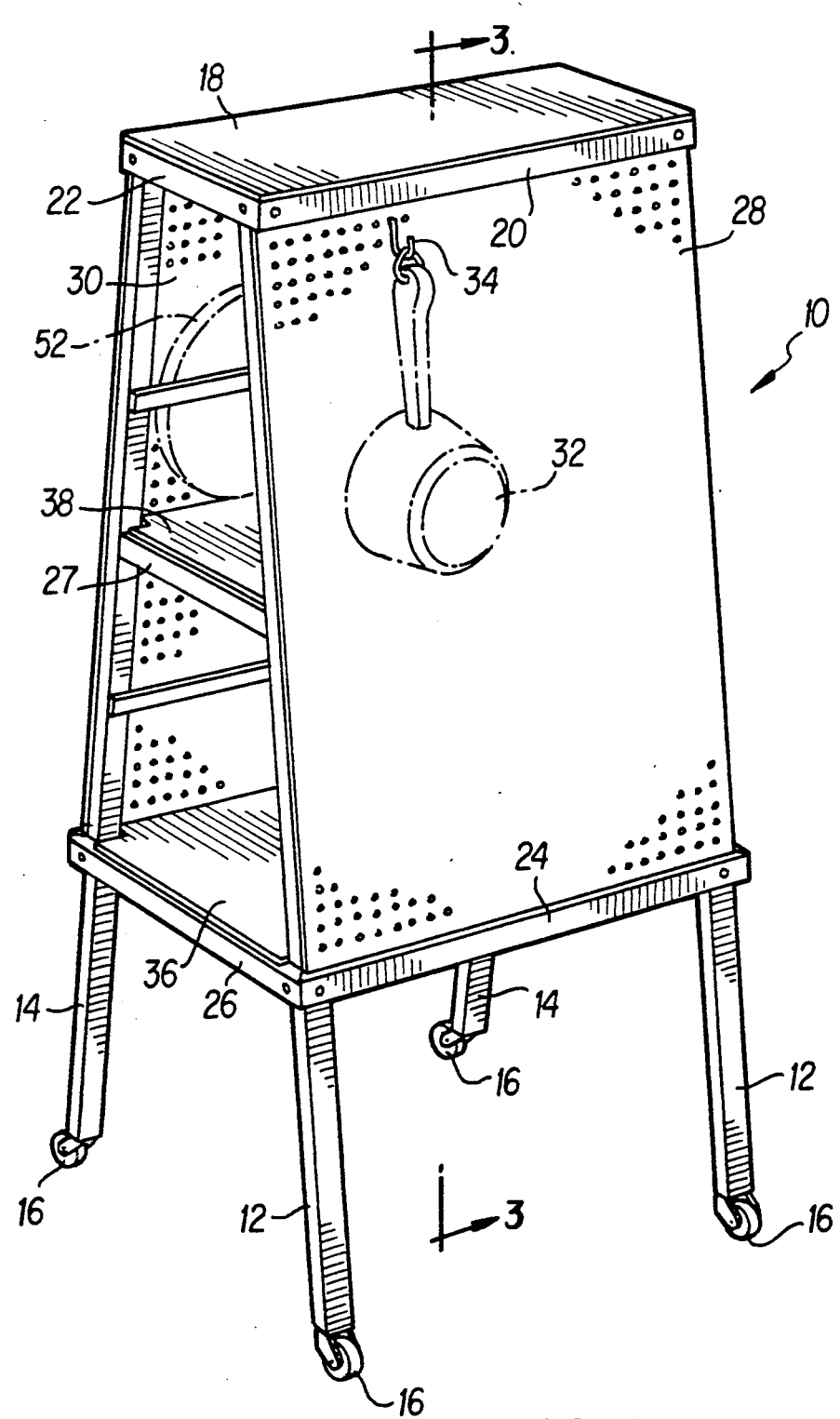
FIG. 1 is a perspective view of the portable storage rack of the present invention.

Referring now to FIG. 1 of the drawings, there is shown a portable rack indicated generally at 10. A pair of front main supporting legs are shown at 12 and a pair of rear supporting legs are shown at 14. The pairs of front and rear main frame leg members 12, 14 slope inwardly toward each other and each leg member has swivel caster wheel members 16 secured to its bottom to provide portability.

A top cover or closure member 18 seals off the top of the portable rack 10. Rigidity for the portable rack 10 is provided at the top by top peripherally extending front and rear support members 20 and top peripherally extending side support members 22. Similarly, rigidity is provided near the bottom by bottom peripherally extending front and rear support members 24 and bottom peripherally extending side support members 26. A side trim member is shown at 27.

A front peg board member 28 is secured to a flat exterior attaching surface of front main supporting legs 12 and a rear peg board member 30 is secured to a flat exterior attaching surface of rear main supporting legs 14. Each peg board member 28, 30 is secured between the top peripherally extending front and rear support members 20 and the bottom peripherally extending support members 24. Thus, it is possible to attach pots and pans to the peg board members for ease of accessibility such as pot 32 illustrated in phantom in FIGS. 1 and 3 secured by a conventional hook 34.

Figure 2:
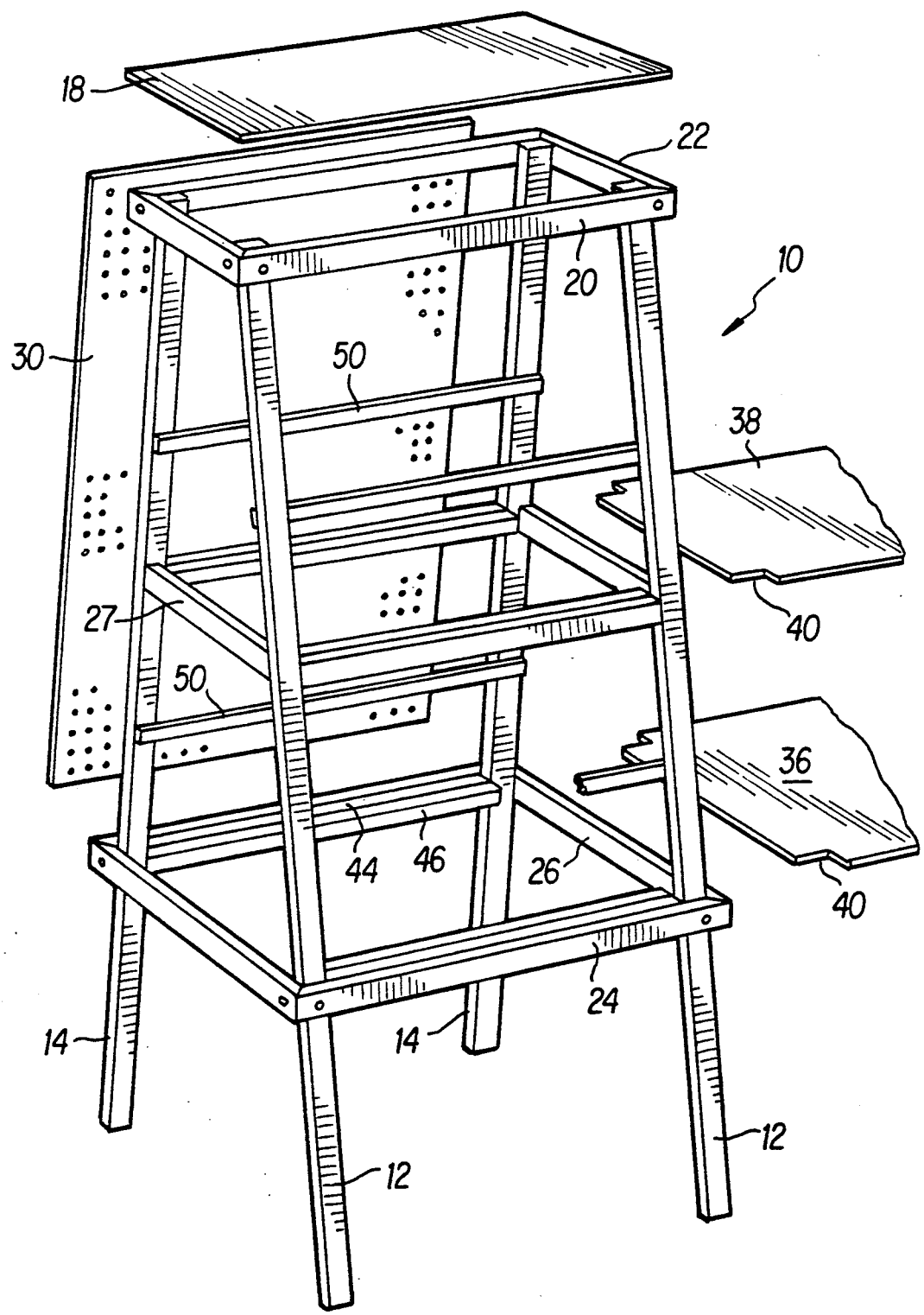
FIG. 2 is an exploded perspective view of the portable storage rack of FIG. 1 with portions removed.
Figure 3:
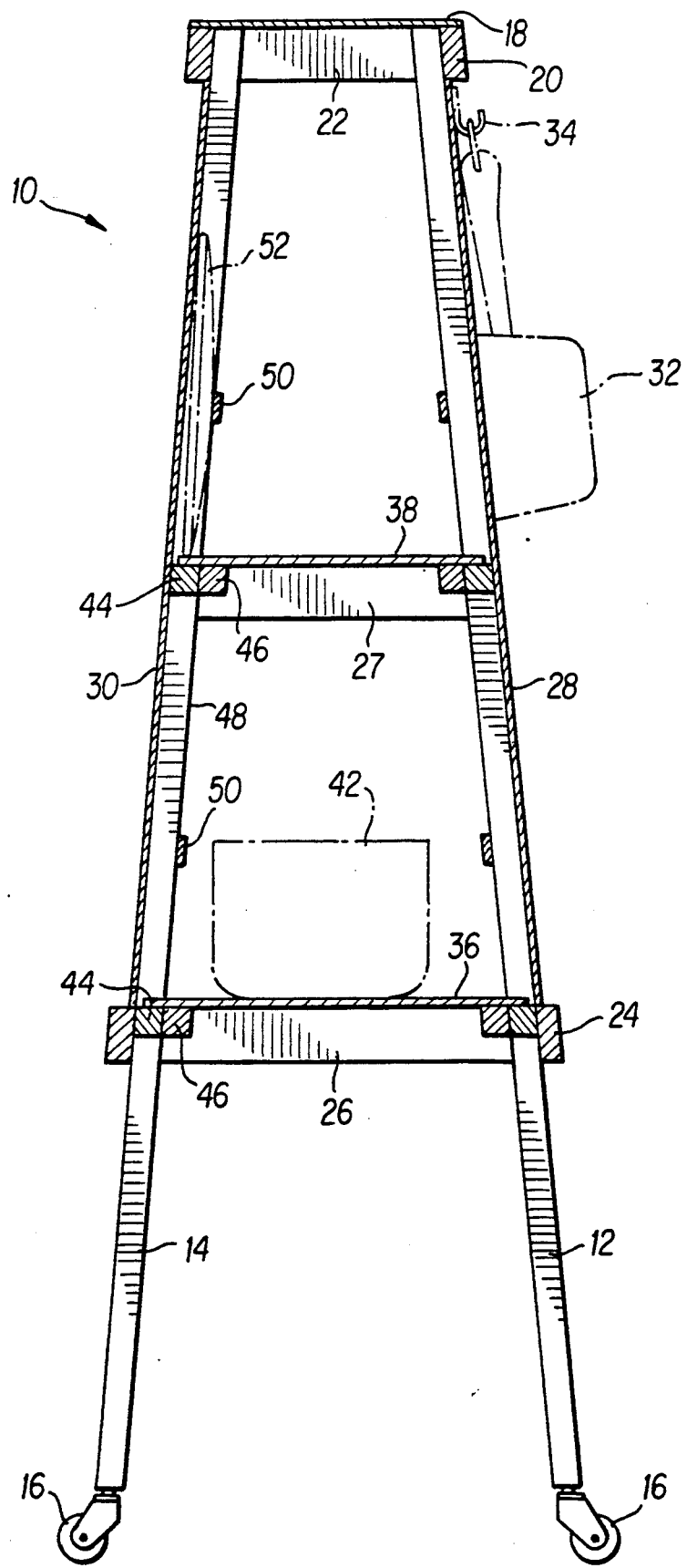
FIG. 3 is an elevational view of the portable storage rack of FIG. 1 taken in vertical cross section along line 3—3 thereof.

It is preferred to utilize a plurality of inner shelf members in the practice of the present invention which extend between the pair of inwardly sloping leg members 12, 14. FIGS. 1-3 illustrate the use of a lower shelf 36 and an upper shelf 38. Preferably, each shelf is notched at 40 in each of the corners of each shelf so as to interfit with the sloping main supporting legs 12, 14. A pan illustrated in phantom at 42 in FIG. 3 shows one use for the shelves.

To provide a sturdy support for shelf members 36, 38 reference is again made to FIG. 3. A first bracing member 44 is positioned immediately behind peg board member 30 and extends between and secured to the pair of rear supporting leg members 14. A second bracing member 46 is placed at the same elevation as first bracing member 44 and in abutting relationship thereto. The second bracing member 46 is secured to a flat inside attaching surface 48 of the pair of rear main supporting legs 14. A similar arrangement of bracing members is provided on the other side of shelf 38. Not only does this construction provide a sturdy support for shelves 36, 38, but it also defines a retaining slot for storing cookie sheets and lids for ports and pans located between the sloping leg members such as is illustrated by the phantom showing of cover 52. The retaining slot for cover 52 in cross section is formed by a portion of peg board member 30, a portion of shelf 38, and retaining strip 50. Retaining slots are thus formed at each end of each shelf 36, 38.

The main frame leg members 12, 14, the top closure member 18, the peripherally extending support members 20, 22, 24, 26 and shelf members 36, 38 and their bracing members 44, 46 are all preferably made from wood. As an illustration and without limitation, the front and rear main supporting legs are $1 \times 2 \times 53\frac{1}{2}''$; the top cover or closure member is $8 \times 24''$; the top and bottom peripherally extending front and rear support members 20, 24 are $1 \times 2 \times 24''$; the top and bottom peripherally extending side support members 22, 26 are $1 \times 2 \times 8''$; the front and rear peg board members 28, 30 are $24 \times 34''$; and the first and second bracing members 44, 46 and retaining strip 50 are $1 \times 1 \times 24''$.

Various changes in trim members may be used without departing from the spirit and scope of the invention.

The invention has been illustrated and described with respect to a preferred embodiment of the invention, but it will be appreciated that the invention may be otherwise variously embodied and practiced within the scope of the claims which follow.

We claim:

1. A portable rack for holding pots, pans, cookie sheets and lids for said pots and pans which comprises,
   a. two pair of main frame leg members with each pair of leg members sloping inwardly toward each other, said leg members having flat outside and inside attaching surfaces,
   b. caster wheel members secured to the bottom of each leg member,
   c. peg board members secured to an outside attaching surface of each pair of inwardly sloping leg members,
   d. a top closure member positioned at the top of said pairs of inwardly sloping leg members,
   e. peripherally extending support members for supporting said top closure member,
   f. a plurality of inner shelf members extending between said pairs of inwardly sloping leg members,
   g. means for defining a retaining slot for cookie sheets and lids for said pots and pans located between said sloping leg members, said means for defining said retaining slot including a portion of an inside surface of one of said peg board members, a portion of one of said shelf members and an additional retaining strip secured to an inside attaching surface of each of a pair of said leg members at a location spaced from said one of said shelf members.

2. A portable rack for holding pots, pans, cookie sheets and lids for said pots and pans as claimed in claim 1 wherein said shelves are notched in their corner locations to receive said inwardly sloping leg members.

3. A portable rack for holding pots, pans, cookie sheets and lids for said pots and pans as claimed in claim 1 wherein said main frame leg members, said top closure member, said peripherally extending support members and said shelf members are all made from wood.

4. A portable rack for holding pots, pans, cookie sheets and lids for said pots and pans as claimed in claim 1 wherein each of said shelf members is supported on one side by a first bracing member positioned immediately behind one of said peg board members and extending between a first pair of leg members supporting said peg board member and a second bracing member at the same elevation as and abutting said first bracing member and secured to inside attaching surfaces of said pair of leg members, and on the other side by a third bracing member positioned immediately behind the other peg board member and extending between a second pair of said leg members supporting the other peg board member and a fourth bracing member at the same elevation as and abutting said third bracing member and secured to inside attaching surfaces of said second pair of leg members.

* * * * *